TRUNK SELECTION ARRANGEMENT

Filed Jan. 20, 1967 5 Sheets-Sheet 1

INVENTORS: J. C. EWIN
A. A. HOOD
E. W. LANDIS

BY Charles H. Davis
ATTORNEY

TRUNK SELECTION ARRANGEMENT

Filed Jan. 20, 1967 5 Sheets-Sheet 2

March 31, 1970 J. C. EWIN ET AL 3,504,129

TRUNK SELECTION ARRANGEMENT

Filed Jan. 20, 1967 5 Sheets-Sheet 5

United States Patent Office 3,504,129
Patented Mar. 31, 1970

3,504,129

TRUNK SELECTION ARRANGEMENT

James C. Ewin, Holmdel, Andrew A. Hood, Red Bank, and Edward W. Landis, Monmouth Beach, N.J., assignors to Bell Telephone Laboratories, Incorporated, Murray Hill, N.J., a corporation of New York Filed Jan. 20, 1967, Ser. No. 610,547
Int. Cl. H04q *3/68;* H04m *7/10*
U.S. Cl. 179—18 9 Claims

ABSTRACT OF THE DISCLOSURE

A program controlled telephone switching system is disclosed having trunk selecting apparatus wherein idle two-way trunks are stored in a register and selected according to the length of time a trunk has been idle and according to the direction of the last call over the trunk.

Figure 1:
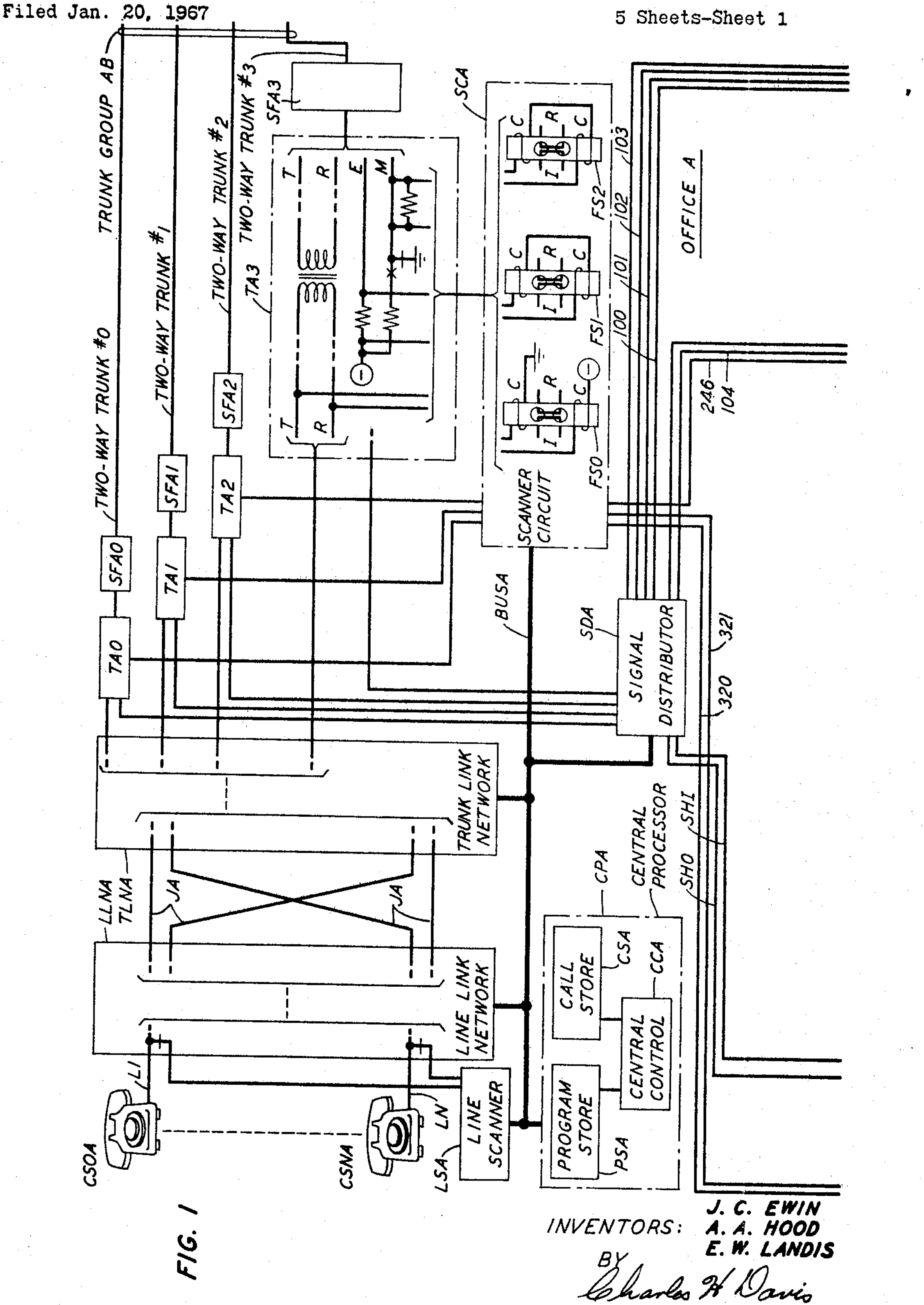

This invention relates to telephone systems and particularly to arrangements for selecting two-way interoffice trunks in a telephone network.

In a more particular aspect, this invention relates to methods and arrangements for reducing the probability that two-way interoffice trunks will be simultaneously seized at both ends. In a still more particular aspect, this invention relates to arrangements for distributing the traffic load over the trunks in a trunk group.

Telephone networks generally comprise a plurality of switching offices interconnected by trunks which are used for communication between customers served by different offices. Depending upon the amount and the direction of traffic between two offices, the trunks that are provided may be one-way trunks which are capable of serving only calls originating at one of the offices or the trunks may be two-way trunks which are capable of completing calls originating at either of the two offices to which the trunks are connected. Under certain traffic conditions wherein the amount and direction of traffic between two offices is unpredictable, one-way trunk groups may be very inefficient. The tendency, therefore, is to provide two-way trunk groups which can be used for calls in either direction between the offices depending upon where the traffic originates.

While two-way trunk groups offer some advantages, it is well known that two-way trunks are subject to certain problems. For example, when a two-way trunk is seized at one end to complete a call originating at one office, a sender is attached at that office and a connect signal is sent to the distant end office to make the trunk busy at the distant office so that the trunk cannot be seized for calls originating at the distant office. This connect signal also causes register equipment at the distant office to be connected to the trunk to receive the called customer's telephone number as it is outpulsed from the calling office sender. During peak busy hour periods when trunks are in great demand, it sometimes happens that a two-way trunk is seized at the distant end office before the trunk circuit thereat has been made busy by the connect signal transmitted from the near end office. Each office, therefore, has sender equipment connected to the trunk waiting to outpulse a called customer's telephone number to a register circuit at the other office. Of course, the register circuits cannot be connected at either office since the trunk circuit at each office is in its outgoing mode and is already connected to a sender circuit. The two sender circuits, one at each office, remain attached to the two-way trunk until they time out releasing the trunk and returning a reorder signal to their calling customers. This condition wherein a two-way trunk is simultaneously seized at both ends has been referred to, and will be referred to herein, as a "glare" condition.

Several prior art arrangements have dealt with the problem of glare conditions in two-way trunk groups. For example, in one known arrangement the individual two-way trunks are arranged to serve only one of the calls in the event that the trunk is simultaneously seized for calls originating at both offices. With this arrangement, a call at one of the offices is permitted to complete over the two-way trunk while another attempt must be made to complete the call that is forced to release at the other office. It will be realized that this arrangement, while suited for its intended purpose, requires many second attempts to complete calls, thereby prolonging the holding time of the common equipment at the switching centers.

Other arrangements are known whereby the individual trunks are directionalized, that is, trunks are temporarily made busy at one office and can only be used as one-way trunks in anticipation of serving only the traffic which originates at the other office. The arrangements for temporarily busying the trunk circuit at one office are often controlled by circuits which are programmed as a result of prior traffic studies to make a few selected trunks busy in each direction during certain hours of the day and to alter the number of trunks that are directionalized to meet the anticipated traffic demand. It will be obvious, of course, that the effectiveness of these arrangements depends on how accurately the traffic which is realized compares with the anticipated traffic. If, for example, the two-way trunks are made busy at one office in anticipation of a large flow of traffic from the other office when, in fact, the trunks are needed due to an unpredicted amount of traffic originating at the first office, then the entire arrangement tends to make the trunking scheme less efficient and service is degraded.

Another problem inherent in prior art trunking schemes is due to the order in which idle trunks are selected for use. For instance, in certan trunk hunting schemes the trunks are arranged in a fixed preferential order and common control equipment at the switching office selects the most preferred idle trunk. During periods of light traffic only the first choice trunks will be selected. If one of these trunks becomes defective and is undetected by standard testing procedures, it is likely that the defective trunk will be selected again and again as repeated attempts are made to complete the call.

While the aforementioned prior art arrangements for selecting trunks are suitable for the intended purposes, they lack certain novel features which we have incorporated in the present invention. In accordance with one illustrative embodiment of our invention, a group of two-way trunks is provided between two switching offices we shall arbitrarily designate office A and office B. To minimize glare conditions and to better equalize trunk usage, each office keeps a "list" of trunks from which idle trunks are selected. The so-called trunk list is a memory module in which the trunk condition is stored for future reference when trunk selection is to be made.

More specifically, each time a trunk becomes idle its trunk number is entered onto the trunk list. The information entered on the list also includes a notation as to whether the trunk was last used outgoing from or incoming to the office containing the list.

When a trunk selection is to be made to serve a call originating at one of the offices, that office consults its trunk list and searches over idle two-way trunks that were last used for calls incoming from the outer office. In other words and with reference to a two-way trunk group between the two offices A and B, for calls originating at office A the control equipment would first search over the idle trunks that were last used for calls incoming from office B and, similarly, the office B control equipment would first search over its trunk list for idle trunks that were last used for calls incoming from office A. By keeping track of the direction of last usage of each trunk, the two-way trunk group is, for the purpose of idle trunk hunting, divided into two subgroups with each office preferring as its first choice trunks from a different subgroup. Of course, if there are no idle trunks in either subgroup the office which normally prefers that subgroup will hunt over trunks in the lesser preferred subgroup, i.e., trunks that were priorly used on calls outgoing from that office.

In accordance with another feature of our invention, while each office is searching for idle trunks in a different subgroup to minimize the probability of a glare condition, the control equipment also prefers those trunks that have been idle longest to provide equal usage of all trunks. More specifically, the trunk numbers of idle trunks are arranged on the trunk list in the order in which the trunks became idle, with the most recently released trunk occupying the least preferred position. As each trunk becomes idle its number is entered into the least preferred position and the trunk numbers of other other trunks on the list are advanced to more preferred positions. When the most preferred trunk is selected from the list the trunk is made busy and the information on the list is updated to reflect the busy condition of the selected trunk. In the event that a call cannot be completed over the trunk, the trunk is released and a second attempt is initiated to complete the call wherein a new trunk is selected from the trunk list. When the first selected trunk is released its trunk number is once again entered in the least preferred position of the list. Thus, by preferring those trunks that have been idle for longer periods, the chance of reseizing a defective trunk on a second attempt to complete the same call is reduced.

Figure 2:
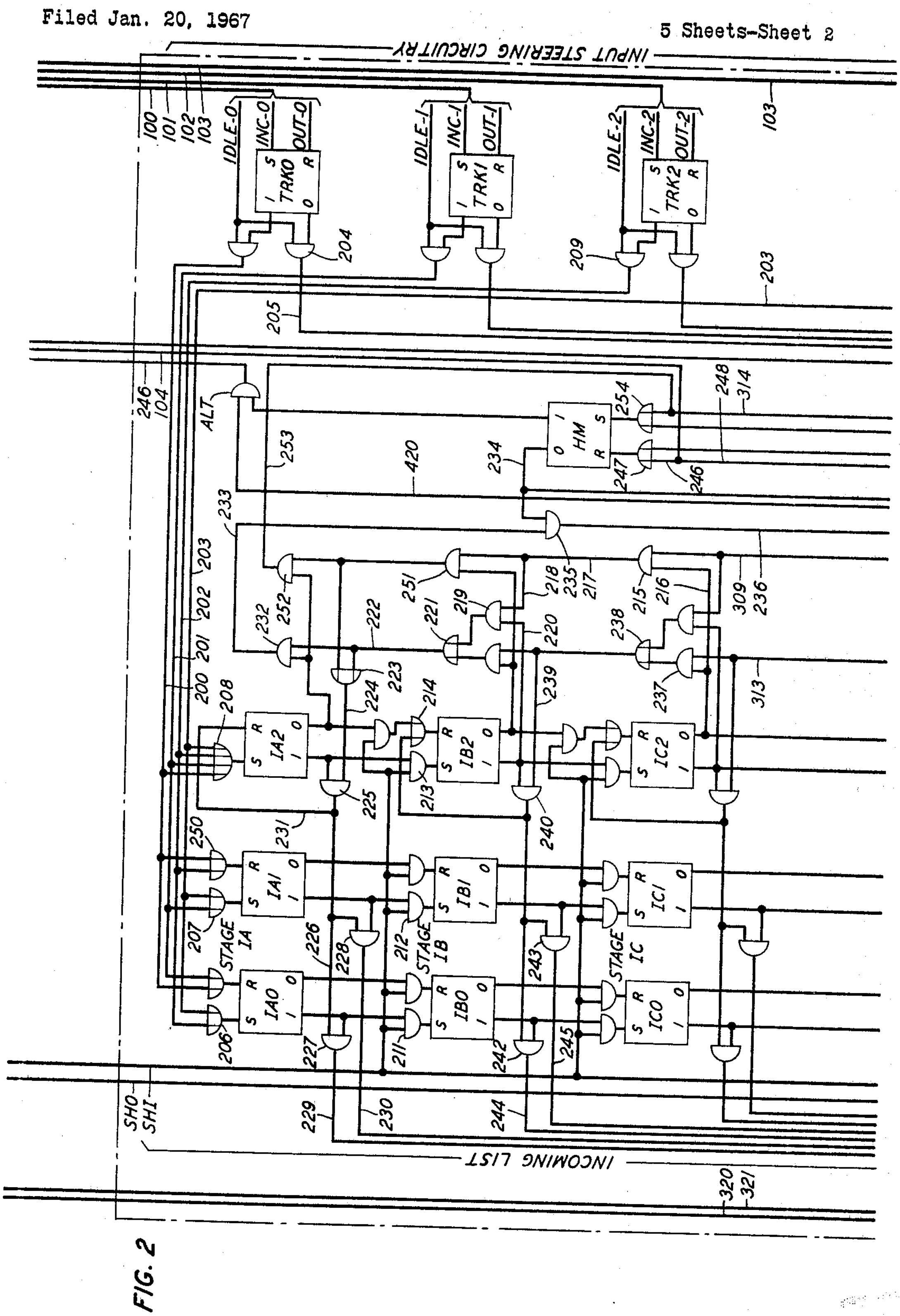
Figure 3:
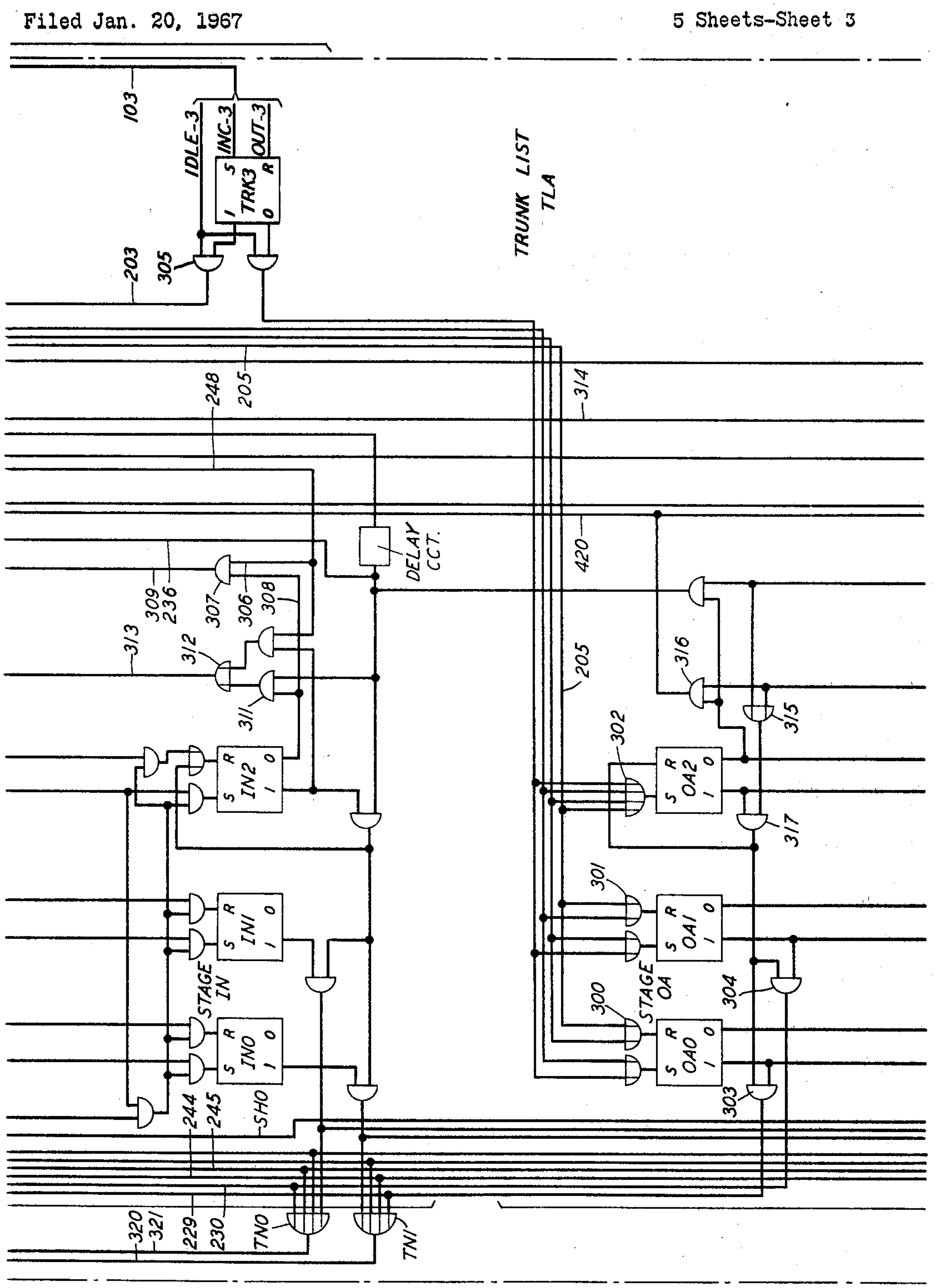
Figure 4:
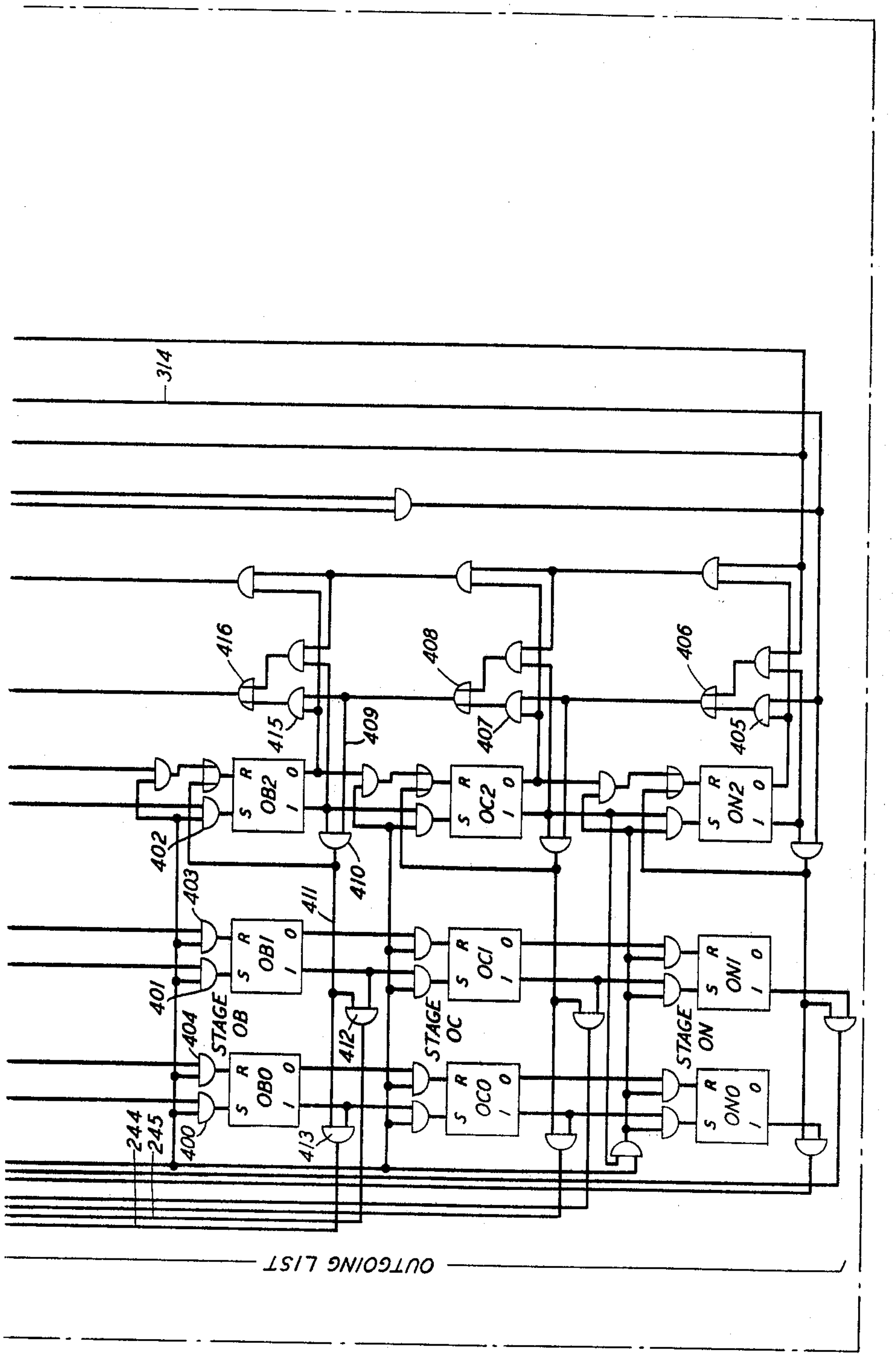
Figures 5, 6:
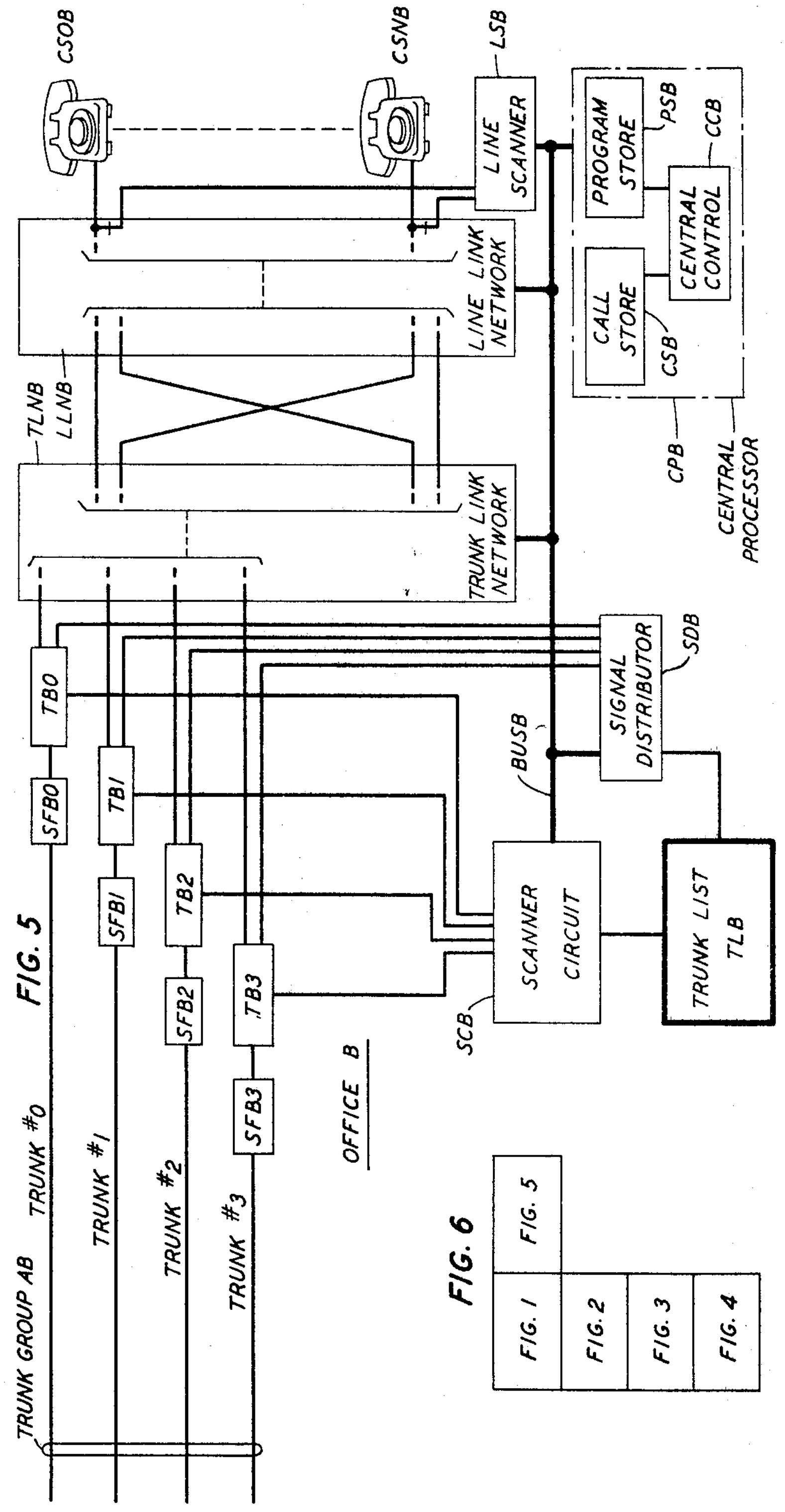

These and other features of the invention will become readily apparent from the following description made with reference to the drawing, in which:

FIG. 1 shows, in block diagram form, a program controlled telephone switching office designated office A which employs the invention;

FIGS. 2, 3, and 4 show, schematically, the trunk list circuitry used for keeping track of trunks available for use at switching office A;

FIG. 5 shows in block diagram form a switching office B and its associated trunk list; and FIG. 6 shows the arrangements of FIGS. 1–5.

While the invention is suitable for use in many types of switching systems, the equipment embodying the principles of the invention is shown being incorporated in a program controlled electronic switching system of the type disclosed in the copending application of A. H. Doblmaier et al., Ser. No. 334,875, filed Dec. 31, 1963, and the Doblmaier et al. disclosure is hereby incorporated by reference as though fully disclosed herein. While the cited Doblmaier et al. disclosure and the references cited therein may be consulted for a more complete understanding of the construction and operation of the electronic switching system, a full understanding of that system is not necessary for an appreciation of the nature and scope of our invention. However, to aid the reader, a brief and general description of that system will be given with reference to switching office A in FIG. 1 and it will be realized that the description is equally applicable to switching office B in FIG. 5.

BRIEF DESCRIPTION

The electronic switching system is designed to serve many customer stations, such as CSOA and CSNA. These telephone stations are connected to switching office A over lines LI and LN which terminate in the line link network LINA and in the line scanner LSA. The line scanner LSA is employed for sensing switch hook signals representing requests for service from the customer stations.

The line link network LLNA comprises switching facilities for establishing communication paths between the customer lines and the junctors JA. The trunk link network TLNA has similar switching facilities for interconnecting the junctors with trunk circuits, such as trunk circuits TA0–TA3. Trunk circuits TA0–TA3 are connected over trunk facilities to similar trunk circuits TB0–TB3 at switching office B. The trunks illustrated in the drawing are two-way trunks, that is, they can be used for completing calls that originate at either office.

As set forth in the above-mentioned Doblmaier et al. disclosure, most of the logic, control, storage, supervisory and translating functions that are required for the operation of this system are performed by the common control equipment comprising the central processor CPA. Accordingly, a minimal amount of control circuitry is needed in the individual trunk circuits and other peripheral circuits, and this circuitry can be actuated by a signal distributor SDA which acts as a buffer between the high speed central processor CPA and the other circuits which are to be controlled.

The central processor CPA ascertains the condition of particular trunk circuits and receives information from trunk list TLA (FIGS. 2–4) through scanning circuitry, such as scanner SCA. The scanner SCA comprises a plurality of ferrod sensors, each of which is associated with leads to be scanned. The ferrod sensor is essentially a transformer comprising a rod of ferrite mtterial with two control windings C and interrogate winding I and a readout winding R. The control windings are connected to the leads to be monitored and the magnetic coupling between the interrogate and readout windings is determined by the current flow in the control windings. Thus, a ferrod sensor, such as FSO in FIG. 1, is connected over the trunk tip and ring through the switching network to the customer line and can detect switch hook signals from the customer's station. The ferrod sensors are further disclosed in Patent 3,175,042 to J. A. Baldwin-H. F. May of Mar. 23, 1965.

Communication between the central processor CPA, signal distributor SDA, and scanners LSA and SCA is over a multiconductor bus system designated BUSA.

As shown in the Doblmaier et al. disclosure, the central processor CPA is a data processing facility for implementing the various administrative, operational, and maintenance functions of the system. The central processor CPA can be divided functionally into the central control unit CCA, the call store CSA, and the program store PSA. The call store CSA has an erasable memory for storing information pertaining to calls in progress, such as the availability of a communication path through the line and trunk link networks.

On the other hand, the program store PSA has a memory which is employed to store work and maintenance programs and information which is not altered frequently, such as the line link network location associated with a particular directory number.

The central control CCA is the primary information processing unit of the switching system. It is capable of executing many different types of basic instructions or orders for controlling the line link network, the trunk link network, and trunk circuits, as well as other functional circuits. These instructions are recorded in program store PSA and are used to inform the switching circuits of the system how and when to perform their various functions. The central control CCA requests instructions from program store PSA and executes or commands the appropriate circuit to execute the proper function. Thus, being the hub of the switching system, the central control CCA also receives back answers from the units which it commands.

OUTGOING CALL

The manner in which the switching office A completes an outgoing call to a customer in switching office B will now be described, as it will be helpful for a clearer understanding of the present trunk selection arrangement.

When a customer originates a call from a station, such as CSOA, he lifts the telephone receiver at his station causing an off-hook signal to be registered in line scanner LSA. When the central control CCA requests a reading of scanner LSA, it detects the off-hook condition of line L1. The central control CCA then consults the call store CSA to ascertain if the off-hook condition had been previously detected. If the off-hook condition had not been previously detected, the central control CCA recognizes this as a legitimate request for service and connects the line over the line and trunk link networks to a customer dial pulse receiver. The customer dial pulse receiver returns dial tone to the calling customer, thereby signaling the customer to begin dialing.

When the central control CCA connects the customer's line to a dial pulse receiver, it also selects an originating register in call store CSA. In this exemplary switching system registers are selected portions of the call store memory CSA which are set aside for storing information pertaining to a particular call. The originating register selected for this call will be used for storing the called directory number as it is dialed by the customer at station CSOA.

The customer dial pulse receiver responds to each digit dialed by the calling customer and each digit is transferred and stored in the originating register. The call being described is to a customer served by switching office B and it will be assumed that seven digits are required to direct the call to the called customer's station. The first three digits represent the office code for switching office B and when they are received and stored in the originating register at office A, the central control CCA can begin translating the code into information that will enable it to select a trunk and cause the called number to be outpulsed to switching office B. The office code translation provides a route index number which is used in deriving routing, alternate routing, and signaling information.

When the last digit is received, the central control CCA hunts for an outpulsing register and transmitter to be used for outpulsing to switching office B. As described above, the register is a section of memory in call store CSA. In the case of an outpulsing register the information that identifies a reserved path between the calling line and the selected outgoing trunk is stored in the outpulsing register along with the identity of the selected transmitter. The basic function of the transmitter, which has not been shown in the drawing, is to pulse the called number to the distant office. The type of pulsing is, of course, determined by the nature of the receiving equipment and the distant office and typically multifrequency, dial pulse and other type transmitters are provided at each switching office. The central control also must hunt for and select an idle trunk to switching office B. In the illustrative embodiment of our invention, it has been assumed that switching office A and switching office B are connected by four two-way trunks 0–3 and to ascertain the availability of an idle trunk, the central control CCA consults trunk list TLA in FIGS. 2–4.

Trunk list TLA can be functionally divided into two sublists and an input steering circuit for controlling entries on each sublist. One sublist at switching office A, referred to herein as the "incoming" list, is used to record idle two-way trunks that were last used on calls originating at switching office B. The other sublist at switching office A, which will be referred to herein as the "outgoing" list, is used to record idle trunks that were last used for calls originating at switching office A. In accordance with a feature of our invention, the offices at both ends of a two-way trunk group are equipped with trunk lists similar to the list depicted in FIGS. 2–4. Of course, it will be realized that the idle trunks appearing on the incoming list at switching office A will appear as idle trunks on the outgoing list at switching office B. Conversely, the trunks that appear as idle trunks on the outgoing list at switching office A will appear as idle trunks on the incoming list at switching office B.

Through the use of incoming and outgoing lists, the two-way trunks in the trunk group AB between offices A and B are divided for idle trunk hunting purposes into two subgroups. One subgroup contains those idle trunks that were last used for calls originating at office A and the other subgroup contains those trunks that were last used for calls originating at office B. As will be explained below, each office will prefer to hunt for an idle trunk in a different subgroup, thereby reducing the chance that both offices will simultaneously seize the same trunk.

The incoming and outgoing lists at each office are substantially the same and comprise a plurality of memory stages for recording the trunk number of each idle trunk. In accordance with another feature of our invention, the stages are arranged in ascending order and each time a two-way trunk becomes idle, its trunk number is entered into the lowest ranking stage of the appropriate list at each office. When a new trunk number is to be entered in the lowest ranking stage of a particular list, the trunk number of the last trunk to become idle and the trunk numbers of all other idle trunks on the list are shifted to the next higher stage, as required, to make room for the new entries. In this manner, the order in which the trunks have become idle is recorded on the lists and trunks can be selected based on the relative length of time a particular trunk is on the idle list.

More specifically, and in accordance with the illustrative embodiment of our invention, the central control at each switching office will hunt for an idle trunk by consulting its own incoming trunk list and the central control will select as its first choice the "second most" idle trunk on that list. Since each office is hunting over its own incoming list, that is, trunks that were last used on calls from the other office, each office will be hunting over a different subgroup of idle trunks. In the event that there is no "second most" idle trunk on the incoming list at one of the offices, such as when there is only one idle trunk on the list, then that office will selected the last idle trunk on its incoming list.

If all idle trunks appearing on the incoming list at switching office A are taken for service, the central control CCA at office A will hunt for an idle trunk from the trunks recorded in its outgoing list. Since the idle trunks on the office A outgoing list also appear on the office B incoming list, both offices will now be hunting over the same subgroup of trunks. It will be recalled that each office prefers to hunt over its incoming list and selects from that list as its first choice the "second most" idle trunk. In the case where both trunks are hunting for an idle trunk in the same subgroup, such as when office A is hunting through its outgoing list and office B is hunting through its incoming list, the office hunting through its outgoing list would prefer the "most" idle trunk while the office hunting through its incoming list will still prefer the "second most" idle trunk. Thus, the probability of a glare condition is further reduced because the possibility of a glare condition is unlikely to occur unless there is only one idle trunk remaining.

While the preferred embodiment of the invention sets forth one order in which trunks may be selected, other arrangements may be contemplated within the spirit and scope of our invention. For example, each office might prefer as its first choice trunks those idle trunks recorded on its outgoing list instead of its incoming list. With this arrangement, however, the trunks would tend to always be used in the same direction as their last usage as compared to the disclosed embodiment which tends to alternate the direction of use of the two-way trunks. Furthermore, each office could select the "most" idle trunk from its preferred list and the "second most" idle trunk from its second choice list. Although this latter arrangement would also alleviate the problems of glare and bad trunk reseizures, certain additional advantages are realized with the preferred disclosed embodiment. For instance, if the switching office skips over the "most" idle trunk and selects the "second most" idle trunk on its first choice list, there is a possibility that a defective trunk would eventually become the "most" idle trunk. During periods of light traffic, if a defective trunk becomes the "most" idle, it will be skipped over thereby further reducing the probability of reseizing a defective trunk.

Once having selected an idle trunk at office A, central control CCA connects a transmitter to the trunk and reserves a network path between the calling line and the trunk circuit. Upon receiving a signal from the distant office B that the called number can be pulsed forward, the transmitter is actuated to outpulse the called directory number. At the completion of the outpulsing, the transmitter is disconnected from the trunk and the reserved network path is utilized to interconnect the calling line and the trunk.

Thus, it can be seen from the above description that the probability of a two-way trunk being seized simultaneously at both offices is reduced by dividing a trunk group for idle trunk hunting purposes into two subgroups based on the direction of the last call over the individual trunks. Those trunks that were last used from office A to office B are put in one subgroup while the trunks that were last used for calls from office B to office A are placed in the other subgroup. Each office first hunts for an idle trunk in that subgroup of trunks that were last used on calls from the other office.

In addition to grouping the trunks based on the direction of their last usage, the trunks are ranked in order relative to the length of time that a trunk is idle. When hunting for an idle trunk, the trunks that have been idle longer are preferred, thereby equalizing the usage of the individual trunks and reducing the probability that a bad trunk will be reseized on a second attempt to complete a call.

DETAILED DESCRIPTION

In order for the reader to gain a better appreciation of the nature and scope of the problems solved by our invention, a more detailed description of the invention will now be given with respect to the drawing and, particularly, with respect to the circuitry for keeping track of idle trunks in trunk group AB.

Let it be assumed that trunks 0, 1, 2, and 3 in trunk group AB are busy on calls. Trunks 0 and 1 are serving calls that originated in office A and terminate in office B while trunks 2 and 3 are busy on calls that originated in office B and terminate in office A. As each trunk becomes idle, its trunk number will be recorded on the trunk list TLA in office A and the trunk list TLB in office B.

Trunk list TLA can be functionally divided into an incoming list shown in FIG. 2 and the upper portion of FIG. 3, an outgoing list shown in the lower portion of FIG. 3 and in FIG. 4, and input steering circuitry shown in the right-hand portion of FIGS. 2 and 3.

Both the incoming and outgoing lists comprise sets of binary shift registers having a plurality of stages. The incoming list stages have been designated IA, IB, IC, and IN, and the outgoing list stages have been designated OA, OB, OC, and ON. Each stage or cross section of the shift register set includes a plurality of flip-flops and gates for recording the trunk number of idle trunks and circuitry for shifting the trunk numbers of trunks that have been idle longer to higher preferred stages as additional trunks become idle. In this illustrative embodiment of the invention four stages have been provided in the shift registers of both the incoming and outgoing lists for trunk group AB thereby making it possible to enter the trunk number and idle condition of all four trunks of the group AB on either list. For larger trunk groups, the lists can be equipped with additional stages. Furthermore, it will be appreciated that additional binary cells can be provided in each stage if it is desired to express the trunk number using a word comprising more than two binary bits as disclosed herein.

The input steering circuitry comprising flip-flops TRK0–TRK3 and their associated gates are provided on a per trunk basis and are used to direct entries onto the incoming or outgoing list depending on the direction in which each trunk was last used.

To illustrate how idle trunks are recorded on the incoming and outgoing lists, let it be assumed that the call on trunk 0 has been terminated and central control CCA is about to take down the connection between trunk circuit TA0 and a calling station terminated in line link network LLNA.

Let it also be assumed that the trunk list TLA is in its initial state with no idle trunks recorded therein. In its initial state, all of the flip-flops are in their reset condition and all gates are disabled. Prior to making an entry on the incoming or outgoing trunk lists, central control CCA addresses signal distributor SDA causing an output signal to be transmitted over shift lead SHI or SHO to advance the trunk numbers of any idle trunks recorded on the lists to the next highest stage. Since it has been assumed that the lists have no trunk numbers recorded therein, this shift signal will have no effect at this time.

Since it has been assumed that trunk 0 was used on an outgoing call from office A and the trunk is now idle, central control CCA addresses signal distributor SDA in FIG. 1 first causing a shift signal to be transmitted over conductor SHO followed by an output signal transmitted over conductors IDLE–O and OUT–O in cable 100 to FIG. 2. The appearance of a signal on conductor OUT–O causes flip-flop TRKO associated with trunk circuit TAO to assume a reset condition, thereby causing an output signal on the "0" lead of flip-flop TRKO and partially enabling AND gate 204. AND gate 204 is completely enabled by the output signal on conductor IDLE–O from the signal distributor SDA, and when enabled, AND gate 204 transmits an output signal over conductor 205 to stage OA (FIG. 3) of the outgoing list.

The output of AND gate 204 enables OR gates 300, 301, and 302 in stage OA. When enabled, OR gate 302 sets flip-flop OA2 and the outputs of enabled OR gates 300 and 301 apply reset signals to flip-flops OA0 and OA1, respectively. The first and second flip-flops of a stage, for example, flip-flops OA0 and OA1 of stage OA, are used for storing the trunk number of a trunk in that stage and the third flip-flop of a stage, such as flip-flop OA2 in stage OA, is used when hunting for a trunk to indicate if there is an idle trunk in a particular stage. In this one illustrative embodiment, the trunk numbers are words each comprising two information bits in binary code form derived from the various combinations of set and reset conditions which the first two flip-flops of a stage can assume. The trunk numbers for trunks 0, 1, 2, and 3 are the binary words 00, 01, 10, and 11, respectively.

Let it now be assumed that a two-way trunk being used on a call incoming from switching office B, such as trunk 3, becomes idle. The central control CCA, when it disconnects trunk circuit TA3 from the called station at switching office A, addresses signal distributor SDA causing a shift signal to be transmitted over the incoming list shift conductor SHI. This shift pulse has no effect at this time since there are no idle trunks registered in the incoming list. Signal distributor SDA then causes output signals to be transmitted over conductors IDLE–3 and INC–3 in cable 103. The output signal on conductor IDLE–3 partially enables AND gate 305 and the signal on conductor INC–3 sets flip-flop TRK3. When flip-flop TRK3 is set, it furnishes a signal on its "1" output to fully enable AND gate 305. When AND gate 305 is enabled, it transmits an output signal over conductor 203 to stage IA of the incoming list. This signal on conductor 203 enables OR gates 206, 207, and 208 which set flip-flops IA0, IA1, and IA2, respectively, thereby registering the trunk number "11" and idle condition of trunk 3 in stage IA. When flip-flops IO0, IA1, and IA2 are set, they produce a signal on their "1" outputs partially enabling AND gates 211, 212, and 213.

Let it be assumed that trunk 2, which was also busy on an incoming call, now becomes idle. The central control CCA recognizes this and causes signal distributor SDA to transmit a signal over incoming shift conductor SHI to FIGS. 2 and 3 to fully enable AND gates 211, 212, and 213. With AND gates 211, 212, and 213 enabled, signals are applied to the set leads of flip-flops IB0, IB1, and IB2 in stage IB and the idle condition and trunk number "11" for trunk 3 which was formerly registered in stage IA is now shifted to stage IB. The central control is now ready to enter the trunk number "10" of trunk 2 on the incoming list and addresses signal distributor SDA to apply output signals over conductors IDLE–2 and INC–2 associated with trunk 2. The signal on conductor INC–2 sets flip-flop TRK2 producing an output signal at its "1" output to AND gate 209. This signal in combination with the output signal on conductor IDLE–2 from signal distributor SDA enables AND gate 209. When enabled, AND gate 209 transmits an output signal over conductor 202 to enable OR gates 208, 250, and 206. The enablement of OR gates 206 and 208 has no effect on flip-flops IA0 and IA2 since these flip-flops are already in their set condition from the previous entry of an idle trunk on the incoming list. The enablement of OR gate 250, however, resets flip-flop IA1. With flip-flop IA0 set and flip-flop IA1 reset the trunk number "10" for trunk 2 is registered in stage IA.

As additional trunks become idle, they are entered on one of the lists by shifting all of the trunk numbers recorded on that list to the next highest stage, as required, to leave the lowest stage available for recording the trunk that just became idle. The one exception to this procedure occurs if the trunk number of the most idle trunk reaches the last stage (ON or IN) of the memory. To prevent shifting the number of another idle trunk into the last stage and forcing the number of the most idle trunk off the list, a trunk number will not be shifted into the last stage unless all lower stages contain the numbers of idle trunks. This can be ascertained by monitoring the next-to-last stage since idle trunk selections are taken from the top of the list and new entries made at the bottom of the list. For example, if the next-to-last stage has no idle trunk number recorded therein this indicates that numbers of idle trunks in all lower stages can be shifted up at least one stage to make room for a new entry at the bottom of the list. If the next-to-last stage contains the number of an idle trunk and a new entry is attempted, the number in the next-to-last stage is permitted to shift to the last stage. This will only occur when the last trunk in a group becomes idle to completely fill a particular list.

In the one illustrative embodiment of the invention, trunk 1 is the only other trunk remaining busy and when it becomes idle, its number "01" is entered on stage OA of the outgoing list by setting flip-flops OA1 and OA2 and resetting flip-flop OA0 after the trunk number "00" for trunk 0 has been shifted from stage OA to stage OB.

While switching office A had been entering the trunk numbers for trunks 0 and 1 on its outgoing list and the trunk numbers for trunks 2 and 3 on its incoming list, similar operations were being performed at switching office B except that the trunk numbers for trunks 0 and 1 were entered on the incoming list at switching office B while the trunk numbers for trunks 2 and 3 were entered on the outgoing list at switching office B.

As new calls are originated at switching offices A and B, trunks will be selected from the corresponding trunk lists TLA and TLB giving preference to those trunks recorded on the incoming portion of the list at each office. In other words, switching office A will prefer the selection of trunk circuits TA2 and TA3 associated with trunks 2 and 3 and switching office B will prefer the selection of trunk circuits TB0 and TB1 associated with the trunks 0 and 1.

To illustrate how idle trunks are selected, let it now be assumed that a calling customer at switching office A has dialed the telephone number of a customer at switching office B and after translation of the office code, the central control CCA is directed to trunk list TLA for the number of an idle trunk.

At this time, trunk 3, which was priorly used on an incoming call and has been idle longest, has its trunk number "11" recorded on flip-flops IB0 and IB1 of stage IB. Trunk 2, which was also used on an incoming call the last time it was used, has its trunk number "10" recorded in flip-flops IA0 and IA1 of the lower stage IA, indicating that this trunk has not been idle as long as trunk 3.

In the outgoing list, trunk 0 has its trunk number "00" recorded in stage OB and trunk 1 has its number "01" recorded in stage OA indicating the order in which these trunks had been released from their last outgoing call.

After central control CCA has translated the digits dialed by the calling customer at switching office A, it interrogates trunk list TLA to ascertain the trunk number of an idle trunk. In this one illustrative embodiment of our invention, the trunk number received from the trunk list is in the form of a two-bit binary word and the number is registered on ferrods (not shown) in scanner circuit SCA for subsequent readout by the central control. When the central control CCA wishes to obtain the trunk number of an idle trunk, it addresses signal distributor SDA causing an output signal to be transmitted over conductor 104 in FIG. 1 to FIG. 2 and over conductor 246 to enable OR gate 247. When OR gate 247 is enabled, it resets hunting mode flip-flop HM. When the hunting mode flip-flop HM is in its reset state, hunting will take place in the incoming list and when flip-flop HM is set, idle trunk hunting will take place in the outgoing list. The signal on conductor 104 is also transmitted over conductor 248 to FIG. 3 and over conductor 306 to AND gate 307. Since there is no idle trunk recorded in stage IN, flip-flop IN2 will be in its reset state applying an output signal to conductor 308 to enable AND gate 307. When AND gate 307 is enabled, it applies an output signal over conductor 309 to AND gate 215 in FIG. 2. Flip-flop IC2 will also be in its reset state indicating that no idle trunk number has been recorded in stage IC. In its reset state, flip-flop IC2 transmits an output signal over conductor 216 to enable AND gate 215. When AND gate 215 is enabled, it causes an output signal to be transmitted over conductors 217 and 218 to AND gate 219.

It will be recalled that trunk 3 is idle and has its trunk number "11" recorded in stage IB and, therefore, flip-flop IB2 will be in its set condition producing an output signal on conductor 220. The signals on conductors 218 and 220 enable AND gate 219 and AND gate 219 enables OR gate 221 over an obvious circuit. When OR gate 221 is enabled, it transmits an output signal over conductor 222 to enable OR gate 223 and when OR gate 223 is enabled, it signals over conductor 224 to partially enable AND gate 225. It will be recalled that the "second most" idle trunk, trunk 2, has its trunk number "10" recorded in stage IA and flip-flop IA2 is in its set condition. With flip-flop IA2 in its set condition, it is producing an output signal on its "1" output, fully enabling AND gate 225. AND gate 225 transmits an output signal over conductor 226 to AND gates 227 and 228. AND gates 227 and 228 will be selectively enabled depending on the states of trunk number flip-flops IA0 and IA1. As described above, when trunk 2 was recorded in stage IA, a signal was transmitted over conductor 202 to enable OR gates 206 and 214, thereby placing flip-flop IA0 in its set condition and flip-flop IA1 in its reset condition. With flip-flop IA0 in its set condition, AND gate 227 will be enabled, thereby producing an output signal over conductor 229 to FIG. 3. In FIG. 3, a signal on conductor 229 enables trunk number OR gate TN1 and OR gate TN0 remains disabled causing a signal to be returned on conductor 320 through FIG. 2 to scanner circuit SCA. In scanner circuit SCA, a signal on conductor 320 and the absence of a signal on conductor 321 will operate only one of the associated ferrods therein, thereby registering the binary word "10" which is the trunk number corresponding to trunk 2 in trunk group AB. The central control can now read out of the scanner circuit SCA the trunk number of the idle trunk to be used on this particular call.

When AND gate 225 was enabled, it also transmitted an output signal over conductor 231 to reset flip-flop IA2, thereby making stage IA appear busy during subsequent hunting.

Thus, as set forth in the above description, the incoming list was interrogated and the trunk that had been idle longest was skipped to permit selection of the next most idle trunk.

Assuming now that another request for service is received by the central control, the central control will go through the same sequence of addressing signal distributor SDA causing an interrogating signal to be transmitted over conductor 104 to the incoming list. As described above, flip-flops IN2, IC2, and IA2 are in the reset state indicating that no idle trunks are recorded in their respective stages and flip-flop IB2 is set indicating that there is an idle trunk recorded in stage IB. Once again, OR gate 221 is enabled providing an output signal on conductor 222 to AND gate 232. Since flip-flop IA2 was reset on the last hunt cycle, it now produces a signal at its "0" output to fully enable AND gate 232. AND gate 232 applies a signal to conductor 233 and, in conjunction with the signal on conductor 234 from the "0" output of the hunting mode flip-flop HM, AND gate 235 is enabled. The enabled AND gate 235 transmits a signal over conductor 236 to AND gate 311 which is enabled due to a signal on conductor 236 and the signal from the "0" output of flip-flop IN2 which is in its reset condition. The enabled AND gate 311 enables OR gate 312 over an obvious path to produce a signal on conductor 313. The signal on conductor 313 and the signal from the "0" output of the reset flip-flop IC2 enables AND gate 237 which, in turn, enables OR gate 238.

When OR gate 238 is enabled, it transmits an output signal over conductor 239 to AND gate 240 and AND gate 240 is enabled by this signal and the output signal from the "1" output of flip-flop IB2 which is in its set condition. When AND gate 240 is enabled, it resets flip-flop IB2 through OR gate 214 indicating that this stage no longer has an idle trunk recorded therein. In addition, AND gate 240 partially enables AND gates 242 and 243 to permit the trunk number to be read out of the stage IB flip-flops IB0 and IB1. It will be recalled from the above description that the number "11" of trunk 3 is recorded in stage IB and this is represented by both flip-flops IB0 and IB1 being in their set condition. This causes both AND gates 242 and 243 to be enabled and output signals to be transmitted over conductors 244 and 245 to enable the trunk number OR gates TN0 and TN1. When both OR gates TN0 and TN1 are enabled, the two-bit binary word "11" is transmitted over conductors 320 and 321 to be registered on ferrods in scanner circuit SCA.

At this point, there are no more idle trunks recorded in the incoming trunk list and to serve additional calls to office B, the central control at office A will now hunt through the outgoing list. Assuming that another call is to be served at office A, central control CCA causes signal distributor SDA to signal over conductors 104, 248, and 306 to AND gate 307. Since all of the IN2, IC2, IB2, and IA2 flip-flops are now in their reset state, AND gates 307, 215, 251, and 252 will be enabled causing an output signal to be transmitted over conductor 253. This signal enables OR gate 254 and sets the hunting mode flip-flop HM. In addition, this signal is transmitted over conductor 314 through FIG. 3 to AND gate 405 in FIG. 4.

The outgoing list has the trunk numbers "00" and "01" of idle trunks 0 and 1 stored in stages OB and OA, respectively. Accordingly, flip-flops OA2 and OB2 will be found set and flip-flops OC2 and ON2 reset. With flip-flop ON2 reset, AND gate 405 is enabled and it, in turn, enables OR gate 406. Similarly, AND gate 407 is enabled by the output of OR gate 406 and the "0" output of flip-flip OC2, and AND gate 407 enables OR gate 408. The enabled OR gate 408 transmits a signal over conductor 409 to AND gate 410. Since the trunk number for idle trunk 0 is stored in stage OB, flip-flop OB2 is in the set state and AND gate 410 will be enabled. When enabled, AND gate 410 resets flip-flop OB2 to mark that stage busy and AND gate 410 transmits a signal over conductor 411 to AND gates 412 and 413. The trunk number "00" for trunk O is recorded in flip-flops OB0 and OB1 by these flip-flops being in a reset state. With the flip-flops in their reset state, gates 413 and 412 are not enabled. Also, the trunk number OR gates TN0 and TN1 are not enabled and the two-bit binary word "00" is registered in scanning circuit SCA where it can be read by the central control.

On the next attempt to seize a two-way trunk to office B, the central control at office A will cause signal distributor SDA to once again signal over conductor 104. Since there are no idle trunks recorded in the incoming list, hunting mode flip-flop HM will be set and the signal will be directed over conductor 314 to the outgoing list. In the outgoing list, there are no idle trunks recorded in any stage but stage OA. Consequently, gates 405 through 408, 415, and 416 in FIG. 4 and gates 315–317 in FIG. 3 will be enabled to permit reading out the trunk number from stage OA. When gate 317 is enabled, it resets flip-flop OA2 and partially enables AND gates 303 and 304. Since flip-flops OA0 and OA1 are, respectively, reset and set, thereby recording the trunk number "01" for trunk 1, only AND gate 304 will be enabled to enable trunk number OR gate TN0. When OR gate TN0 is enabled and OR gate TN1 disabled, the two-bit binary word "01" is transmitted over conductors 320 and 321 and registered in scanner SCA.

Thus, from the above description, it can be seen that having found no idle trunks in the incoming list at office A, the central control selects trunks from the outgoing list preferring as its first choice the trunks that have been idle longest.

With selection of trunk 1, there are no more idle trunks recorded on either list. If central control CCA interrogates trunk list TLA for another trunk number, the same path as traced for previous trunk hunting will be followed to stage OA. Since flip-flop OA2 is now in its reset state, AND gate 316 will be enabled transmitting an output signal over conductor 420. The output signal on conductor 420 and the "1" output from the hunting mode flip-flop HM enables AND gate ALT in FIG. 2. The enablement of AND gate ALT causes a signal to be transmitted over conductor 246 to scanner SCA. This signal, when registered in the scanner, informs the central control that no idle trunks are available in the selected direct route and an alternate route must be taken.

On calls which originate in office B and terminate in office A, the trunk lists in the incoming office A must be updated to reflect the seizure of an idle trunk by the outgoing office B. This can be accomplished by causing the central control at the incoming office A to simulate an idle trunk hunting operation while establishing the connection between the selected trunk and the called line. This hunting operation will reset the busy-idle flip-flop in the appropriate stage to remove the selected trunk from the list at the incoming office.

It is to be understood that the above-described arrangements are merely illustrative of the application of the principles of the invention. Numerous other arrangements may be devised by those skilled in the art without departing from the spirit and scope of the invention.

What is claimed is:

1. In a telephone system, a first and a second switching office, a plurality of two-way trunks for extending calls in either direction between said offices, means for dividing said trunks into two groups in accordance with the direction of last use, means for ranking said trunks in each of said groups relative to the length of time each said trunk is idle, means at each said office controlled by said ranking means for selecting said idle trunks, and switching means for establishing connections to selected trunks.

2. The invention defined in claim 1 wherein said ranking means comprises an incoming and an outgoing memory store at each said office and means for recording in the incoming store of said first office and the outgoing store of said second office those idle trunks that were last used on calls from said second office and for recording in the outgoing store of said first office and the incoming store of said second office those idle trunks that were last used on calls from said first office and wherein said selecting means at each said office comprises means for interrogating said incoming and outgoing stores thereat.

3. The invention defined in claim 2 wherein said interrogating means function to select trunks from said incoming store when at least one idle trunk is recorded therein and said interrogating means are controlled to select trunks from said outgoing store when all idle trunks are recorded in said outgoing store.

4. The invention defined in claim 3 wherein each of said trunks is identified by a trunk number, and wherein each said store comprises a plurality of stages and means for selectively actuating said stages to represent the trunk number associated with any idle trunk.

5. The invention defined in claim 4 wherein each said store further comprises means for establishing a rank order of preference among said stages.

6. The invention defined in claim 5 wherein said actuating means comprises means for shifting the trunk numbers of idle trunks to higher ranked stages when additional trunks become idle and steering means for actuating the lowest ranked stage to represent the last trunk to become idle.

7. The invention defined in claim 6 wherein each said stage comprises a first memory cell for registering the trunk number of one of said trunks and a second memory cell for indicating the idle condition of said one trunk.

8. In a telephone system, a first and a second switching office; a plurality of two-way trunks for extending calls in either direction between said offices; an incoming and an outgoing memory store at each said office; means for registering idle ones of said trunks in one of said memory stores at each said office based on the direction of the last call extended over each said idle trunk; means for arranging said idle trunks in each memory store in a preferential order beginning with the most idle trunk; and means at each said office for equalizing trunk usage and reducing the probability that both said offices will simultaneously attempt to extend calls over the same idle trunk comprising means at each said office for interrogating its incoming memory store for selecting the second most idle trunk registered therein, means effective when said second most idle trunk in a said incoming memory store is unavailable for interrogating said incoming memory store for selecting the most idle trunk and means effective when no idle trunks are registered in said incoming memory store for selecting the most idle rtunk registered in said outgoing memory store.

9. A method for minimizing the probability that two-way trunks in a group between a first and second office will be simultaneously seized at both offices comprising the following steps, dividing the trunks into two subgroups, one subgroup containing all idle trunks last used in originating a call from the first to the second office, the second subgroup containing all idle trunks last used in originating a call from the second to the first office, arranging the idle trunks in ascending order in each subgroup based on the relative length of time each trunk has been idle, and causing each office to prefer the selection of trunks in a different subgroup and prefer those trunks having been idle longer than other trunks.

References Cited

UNITED STATES PATENTS

| | | |
|---|---|---|
| 3,334,191 | 8/1967 | Arseneau et al. |
| 2,769,864 | 11/1956 | Parks. |

KATHLEEN H. CLAFFY, Primary Examiner

T. W. BROWN, Assistant Examiner

U.S. Cl. X.R.

179—18